(12) United States Patent  
Zeller et al.

(10) Patent No.: US 8,300,624 B2  
(45) Date of Patent: Oct. 30, 2012

(54) SIGNALING ALLOCATION METHOD AND APPARATUS THEREOF

(75) Inventors: Dietrich Zeller, Sindelfingen (DE); Markus Gruber, Stuttgart (DE)

(73) Assignee: ALCATEL LUCENT, Paris (FR)

( * ) Notice: Subject to any disclaimer, the term of this patent is extended or adjusted under 35 U.S.C. 154(b) by 428 days.

(21) Appl. No.: 12/489,635

(22) Filed: Jun. 23, 2009

(65) Prior Publication Data

US 2009/0323616 A1    Dec. 31, 2009

(30) Foreign Application Priority Data

Jun. 23, 2008 (EP) .................................... 08290598

(51) Int. Cl.  
*H04J 3/06* (2006.01)

(52) U.S. Cl. ........................................................ 370/350

(58) Field of Classification Search .................. None  
See application file for complete search history.

(56) References Cited

U.S. PATENT DOCUMENTS

| | | | |
|---|---|---|---|
| 2007/0167180 A1 | 7/2007 | Ramesh et al. | |
| 2008/0069280 A1* | 3/2008 | Wang et al. | 375/363 |
| 2009/0268602 A1* | 10/2009 | Han et al. | 370/208 |
| 2010/0091907 A1* | 4/2010 | Noh et al. | 375/302 |
| 2010/0135257 A1* | 6/2010 | Higuchi et al. | 370/336 |
| 2010/0272004 A1* | 10/2010 | Maeda et al. | 370/312 |
| 2011/0013554 A1* | 1/2011 | Koskinen | 370/315 |

FOREIGN PATENT DOCUMENTS

| | | |
|---|---|---|
| EP | 1 372 350 A1 | 12/2003 |
| WO | WO 2006/074355 A2 | 7/2006 |
| WO | WO 2006/104346 A1 | 10/2006 |

OTHER PUBLICATIONS

"Universal Mobile Telecommunications System (UMTS); Synchronization in UTRAN Stage 2 (3GPP TS 25.402 version 7.5.0 Release 7)," vol. 3-R3, No. V7.5.0; XP 014040644; pp. 1-52, (Jan. 1, 2008).  
Alcatel Shanghai Bell, "Synchronization Requirements for MBMS RF Combining in LTE SFN,", XP002470008, pp. 1-3, (Aug. 28-Sep. 1, 2006) (retrieved from the internet Feb. 19, 2008).  
European Search Report.

* cited by examiner

*Primary Examiner* — Hassan Phillips  
*Assistant Examiner* — Prenell Jones  
(74) *Attorney, Agent, or Firm* — Fay Sharpe LLP

(57) ABSTRACT

The invention provides a signalling method in a first base station of a mobile communications system adapted for synchronized multimedia broadcast/multicast transmissions, the first base station transmitting to a wireless terminal, the mobile communication system further comprising a set of base stations neighboring the first base station, the method comprising: transmitting a signal describing the set of base stations over a broadcast channel by the first base station to at least a wireless terminal. Further, a first bit of the signal indicates if a first subframe allocation pattern of synchronized subframes per radio frame in the first base station equals a second subframe allocation pattern of synchronized subframes per radio frame for all base stations of the set of base stations. The set of base stations neighboring the first base station are candidates for starting a transmission to the wireless terminal.

19 Claims, 5 Drawing Sheets

MOBILE COMMUNICATION SYSTEM
100

SIGNALING ALLOCATION METHOD AND APPARATUS THEREOF

BACKGROUND OF THE INVENTION

The invention is based on a priority application EP 08 290 598.5 which is hereby incorporated by reference.

The invention relates to a method of resource allocation signaling in a mobile communication system, to a base station and to a computer program product.

The connection between a wireless terminal and a network element of a wireless wideband communication network is generally established via an air interface. The air interface can be a wireless wideband system compliant with the IEEE 802.16 or Long Term Evolution (LTE) standard. The wideband wireless systems, apart from the unicast communications, may also provide multicast and broadcast services to the wireless terminals. The broadcasting mode uses the network capabilities to send information to all destinations without congesting the network capacity, using either broadcast channels or different world routing methods. A more controlled approach is reached using the multicast mode, as it transports the packets to a group of destinations simultaneously, delivering the message over each link of the network only once and creating copies only when the link to the destinations split.

The wireless terminals may receive several versions of the same packets or frames within a multicast and broadcast zone from several base station transmitters. This can be used, for example, for multimedia broadcast and multicast services. The terminals may take advantage of the plurality of packets using the principle of macro diversity and thus improving the reception quality of the signal. In this context, terminals always need to know which resource entities are synchronized and which are not synchronized in order to correctly perform measurements of the reference symbols.

There is therefore a need for a resource allocation signaling method in a mobile communication system, to a base station and to a computer program product.

SUMMARY OF THE INVENTION

The invention provides a signalling method in a first base station of a mobile communications system adapted for synchronized multimedia broadcast/multicast transmissions, the first base station transmitting to a wireless terminal, the mobile communication system further comprising a set of base stations neighbouring the first base station, the method comprising: transmitting a signal describing the set of base stations over a broadcast channel by the first base station to at least a wireless terminal. Further, a first bit of the signal indicates if a first subframe allocation pattern of synchronized subframes per radio frame in the first base station equals a second subframe allocation pattern of synchronized subframes per radio frame for all base stations of the set of base stations. The set of base stations neighbouring the first base station are candidates for starting a communication with the wireless terminal.

Embodiments of the invention are advantageous in that the wireless terminal receives information related to neighboring base stations before entering in their cell or coverage area. The information describes whether all neighboring cells have the exact same subframe allocation pattern of synchronized subframes per radio frame than the allocation of the first base station. If the subframe allocation pattern matches, the wireless terminal may initiate more accurate measurements before the neighboring base station provides the information of the subframe allocation pattern, increasing the performance of the measurements. The first base station may be a part of a set of base stations transmitting to the wireless terminal the synchronized subframes.

In embodiments of the invention the synchronized subframes contain data of the synchronized multimedia broadcast/multicast transmissions.

Embodiments of the invention further comprise initiating a first measurement of a channel quality of the set of base stations by the wireless terminal by excluding synchronized subframes of all radio frames according to the first subframe allocation pattern if the first bit indicates that the first subframe allocation pattern equals the second subframe allocation pattern. The wireless terminal is thus able to initiate more accurate measurements if the subframe allocation patterns are the same, without having the information related to the radio frame allocation pattern.

In embodiments of the invention a second bit of the signal indicates if a first radio frame allocation pattern of radio frames comprising the first subframe allocation pattern in the first base station equals a second radio frame allocation pattern of radio frames with any subframe allocation pattern for all base stations of the set of base stations. The first and second radio frame allocation pattern occur within a predetermined repetition period. The second bit of the signal indicates differences in the allocation of radio frames within the repetition period that are eligible to allocate synchronized subframes.

Embodiments of the invention further comprise initiating a second measurement of the channel quality by the wireless terminal by excluding all synchronized subframes, if the first bit indicates that the first subframe allocation pattern equals the second subframe allocation pattern and if the second bit indicates that the first radio frame allocation pattern equals the second radio frame allocation pattern. If the first and second bit indicate a match in the allocation patterns, the wireless terminal can accurately measure the channel quality on a greater amount of subframes, as the wireless terminal knows the exact allocation of all synchronized subframes on all radio frames.

In another aspect, the invention relates to a resource allocation signalling method in a first base station of a mobile communications system adapted for synchronized multimedia broadcast/multicast transmissions, the first base station transmitting to a wireless terminal. The method comprises:

transmitting periodically a first signal information block by a first base station of the set of neighbouring base stations to a wireless terminal, wherein the first signal information block comprises information on a subframe allocation pattern of synchronized subframes per radio frame;

transmitting periodically a second signal information block by the first base station to the wireless terminal.

The first signal information block is periodically transmitted more frequently than the second signal information block. The second signal information block comprises information on an allocation pattern of radio frames carrying synchronized subframes within a predetermined repetition period. The synchronized subframes are allocated within the radio frames according to the information of the first information block. By transmitting the first signal information block more frequently, the wireless terminal quickly receives the necessary information to initiate more accurate measurements, even without having a precise information of the frame allocation pattern.

Embodiments of the invention further comprise initiating a measurement of a channel quality by the wireless terminal by excluding synchronized subframes of all radio frames according to the information transmitted by the first signal information block.

In embodiments of the invention the periodic transmission of the second signal information block equals the predetermined repetition period of radio frames.

In embodiments of the invention the second information block is not transmitted, if the first information block indicates that no synchronized subframes are assigned. Further, each bit of the second signal information block indicates an allocation of synchronized subframes of a pair of radio frames.

In embodiments of the invention the first base station is part of the set of neighbouring base stations according to transmitting a signal describing said set of base stations over a broadcast channel by said first base station to said wireless terminal; wherein a first bit of said signal indicates if a first subframe allocation pattern of synchronized subframes per radio frame in said first base station equals a second subframe allocation pattern of synchronized subframes per radio frame for all base stations of said set of base stations;
wherein said set of base stations neighboring said first base station are candidates for starting a transmission to said wireless terminal.

In another aspect, the invention relates to a base station for a mobile communication system being operable to perform in accordance with any one of the preceding embodiments.

In another aspect, the invention relates to a computer program product stored on a storage medium, comprising executable program means for causing a base station to perform a method according to any of the preceding embodiments when the program is run on the base station.

BRIEF DESCRIPTION OF THE DRAWINGS

In the following preferred embodiments of the invention will be described in greater detail by way of example only making reference to the drawings in which.

DETAILED DESCRIPTION

Figure 1:
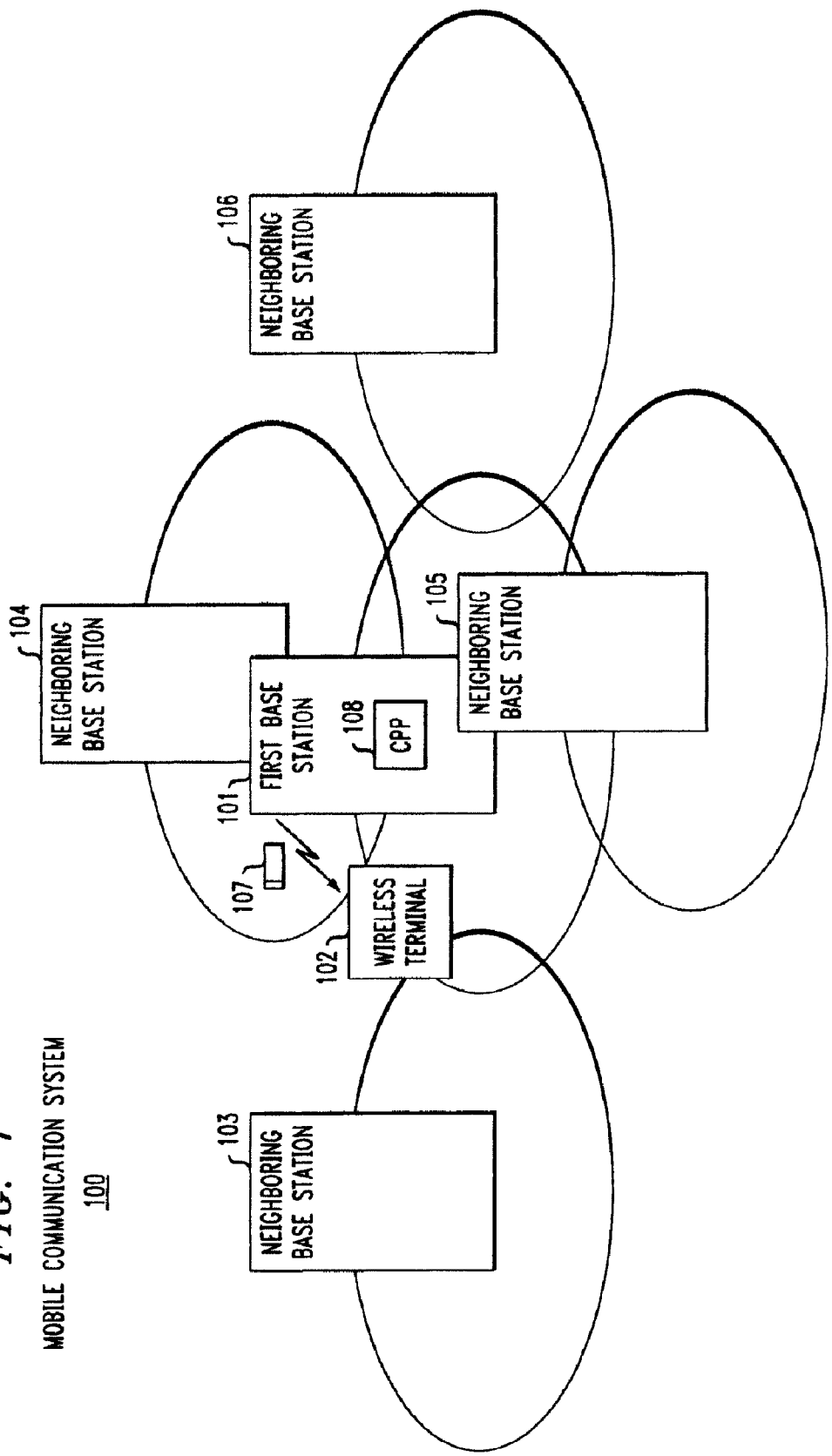
FIG. 1 shows a first block diagram of a signaling method.

FIG. 1 shows a mobile communication system 100 including a first base station 101 transmitting to a wireless terminal 102. The mobile communication system 100 further comprises a set of neighboring base stations 103 to 106. At least one of the base stations of the mobile communication system is adapted for synchronized multimedia broadcast/multicast transmissions.

The first base station 101 is adapted for transmitting a signal 107 that contains a description of the set of neighboring base stations 103 to 106 over a broadcast channel. The signal 107 contains a first bit that indicates if the subframe allocation pattern of synchronized subframes on a radio frame in the first base station 101 is the same as the subframe allocation pattern of synchronized subframes per radio frame for all base stations of the set of neighboring base stations 103 to 106. If the subframe allocation pattern of each one of the base stations neighboring the first base station equals the subframe allocation pattern of the first base station 101, it is possible for the wireless terminal 102 to initiate measurements on the subframes that are not synchronized according to the subframe allocation pattern when switching from the first base station to a neighbouring base station. This is possible as the wireless terminal 102 is aware of the subframe allocation pattern of the first base station 101. The synchronized subframes may contain data of said synchronized multimedia broadcast/multicast transmissions.

The signal 107 may contain a second bit indicating if the radio frame allocation pattern of radio frames, containing the subframe allocation pattern within a predetermined frame repetition period in the first base station 101, is the same as the frame allocation pattern of the radio frames regardless of the subframe allocation pattern for all the base stations of the set of neighboring base stations 103 to 106. The second bit indicates what radio frames within a predetermined repetition period are eligible to contain synchronized subframes that typically carry synchronized multimedia broadcast/multicast services.

The second bit may be known as a macro difference indicator, as it compares an allocation pattern of radio frames within the repetition period without regard of the internal allocation pattern of the synchronized subframes within the radio frames. On the other hand, the first bit indicates the allocation pattern of the subframes of a radio frame eligible to carry the synchronized subframes. The first bit may also be called micro difference indicator, as it only contains information regarding the allocation patterns of the synchronized subframes within a radio frame, without regard of what radio frames are assigned to contain synchronized subframes.

If the wireless terminal receives the signal 107 with the first and the second bit, and both bits indicate that the macro allocation pattern and the micro allocation pattern of the set of neighboring base stations 103 to 106 share the same pattern found in the transmissions from the first base station 101, the wireless terminal 102 can initiate measurements on exactly all subframes that are not synchronized. This allows an accurate and immediate initiation of the measurements, as it does not require to wait for the signaling from the neighboring base stations indicating which subframes are synchronized within the transmission period. The first base station 101 may include a computer program product 108 for causing the base station to perform the steps described.

Figure 2:
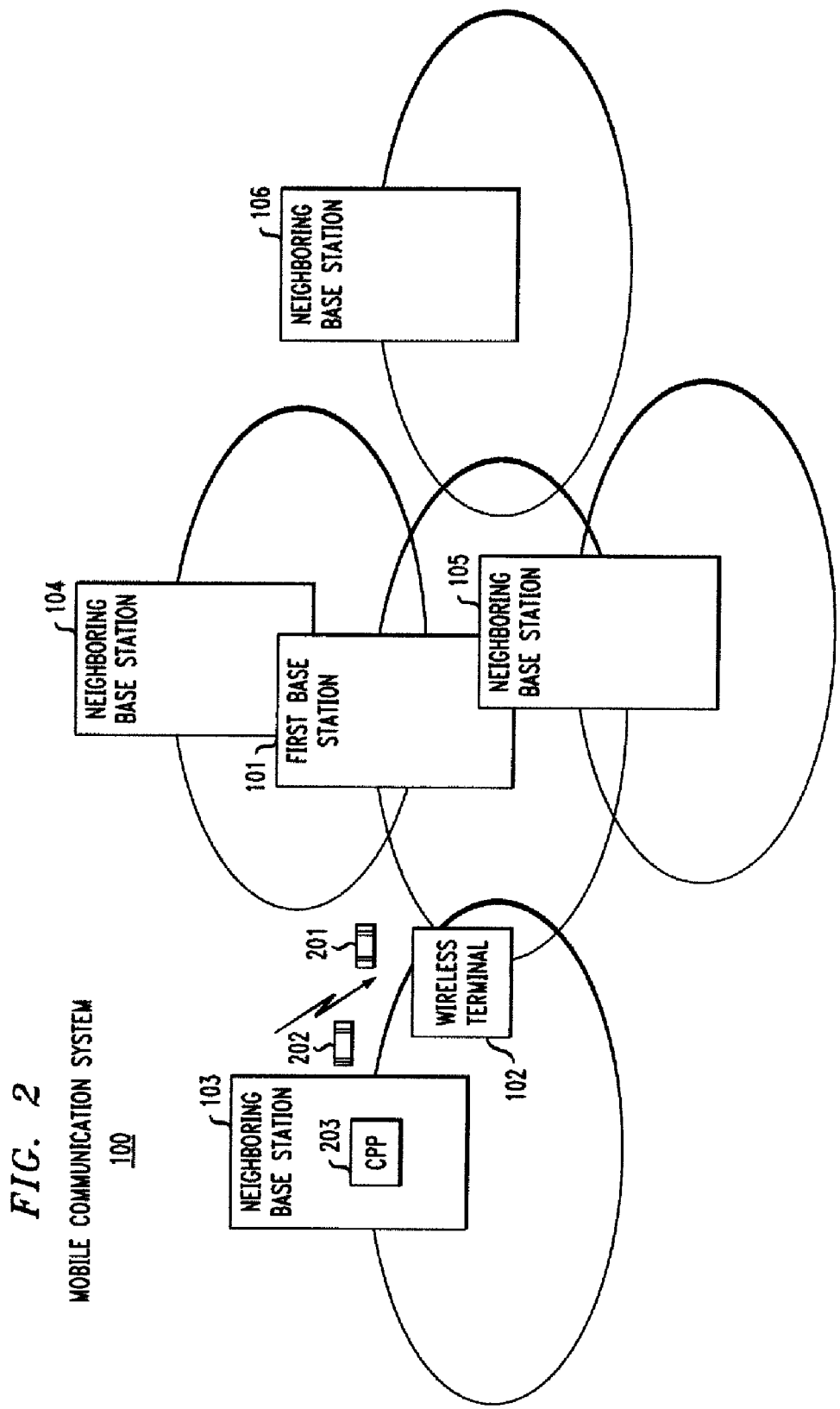
FIG. 2 shows a second block diagram of another signaling allocation method.

FIG. 2 shows the mobile communication system 100 including the first base station 101, the wireless terminal 102 receiving data from the base station 103 of the set of neighboring base stations 103 to 106. The wireless terminal 102 starts the communication with the neighboring base station 103 as a result of a reselection process or a handover between the first base station and the neighboring base station 103.

The neighboring base station 103 periodically transmits a first signal information block 201 to the wireless terminal. The first signal information block 201 includes information describing the subframe allocation pattern of synchronized subframes for any radio frame. This information describes the position of the synchronized subframes within a radio frame that is eligible to carry synchronized subframes. The neighboring base station 103 further transmits a second signal information block 202 containing information describing the allocation pattern of the radio frames carrying synchronized subframes for a predetermined repetition period. The second signal information block informs the wireless terminal of what radio frames within the repetition period may contain the synchronized subframes.

The frames carrying synchronized subframes allocate these synchronized subframes according to the information of the first information block. The first information block is transmitted more frequently than the second information block. As the first information block is transmitted more frequently, the wireless terminal 102 is able to quickly initiate more accurate measurements related to the channel quality, as it already receives the exact configuration of the allocation pattern of the synchronized subframes for a radio frame.

The periodic transmission of the second signal information block may be similar or equal to the predetermined repetition period of the radio frames. In case that the first information block indicates that no synchronized subframes are assigned for any radio frame, then the second information block is optionally not transmitted. Further, the second signal information block contains information on the allocation of the synchronized subframes for any radio frame. Each bit of the second signal information block may indicate an allocation of subframes for each of radio frame. Alternatively, each bit of the second signal information block may indicate an allocation of subframes for a pair of radio frame The base station 103 may include a computer program product 203 for causing the base station to perform the steps described.

Figure 3:
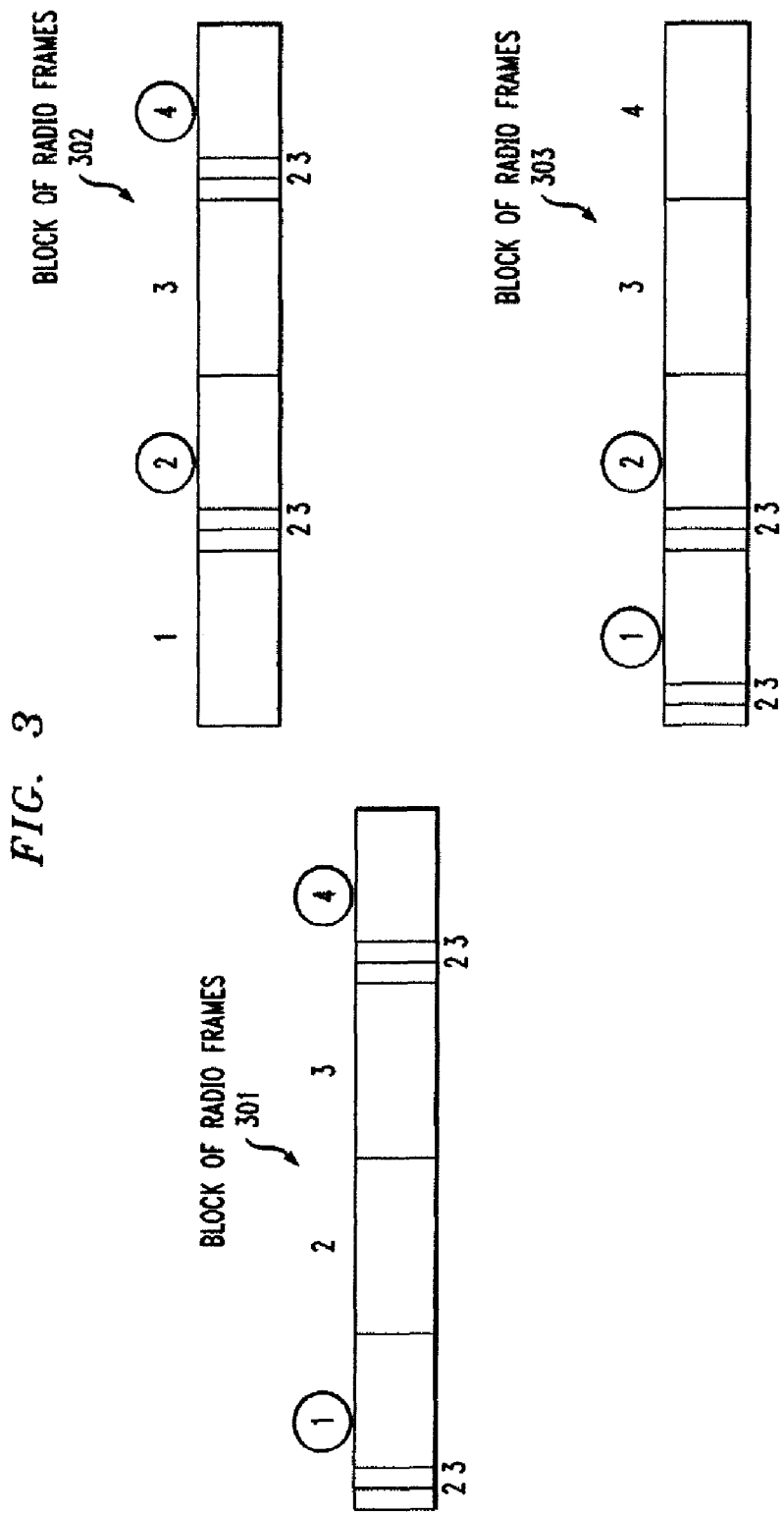
FIG. 3 shows an example of a set of frames and sub-frames.

FIG. 3 shows three blocks of radio frames 301 to 303 comprising four radio frames for each block of frames. The four radio frames correspond to the predetermined repetition period of the radio frames. The block of radio frames 301 corresponds to the block transmitted by the first base station of FIGS. 1 and 2 and the blocks 302 and 303 correspond to the neighboring base stations described in the previous figs.

The subframe allocation pattern of the radio frames of the block 301, that corresponds to the first base station 101, allocates the synchronized subframes in the subframes positions 2 and 3. The radio frame allocation pattern corresponding to the radio frames of the block 301 allocates the synchronized subframes in the radio frame positions 1 and 4. In the first neighboring base station that transmits the block of radio frames 302, the subframe allocation pattern equals to the allocation pattern of the first base station, as the synchronized subframes are allocated in the subframes positions 2 and 3. This is the same for the third radio frame block 303. If all neighboring base stations allocate their subframes within a radio frame with this pattern allocation, the first bit indicates this pattern allocation to the wireless terminal 102.

If the radio frame allocation pattern is compared between the first base station and the neighboring base stations, taking as an allocation pattern the frames represented in the blocks 301 to 303, all three blocks have different radio frame patterns. In the first base station 101, the corresponding block 301 has a radio frame allocation pattern for the radio frames 1 and 4, and the neighboring base station with the corresponding radio frame block 302 has a radio frame allocation pattern using the radio frames 2 and 4. In the same way, another neighboring base station transmitting the block 303 use the radio frames 1 and 2 to transmit the synchronized subframes. Therefore, the second signal that compares the radio frame allocation patterns indicate to the wireless terminal that the frame allocation patterns are different between the first base station and the neighboring base stations.

Figure 4:
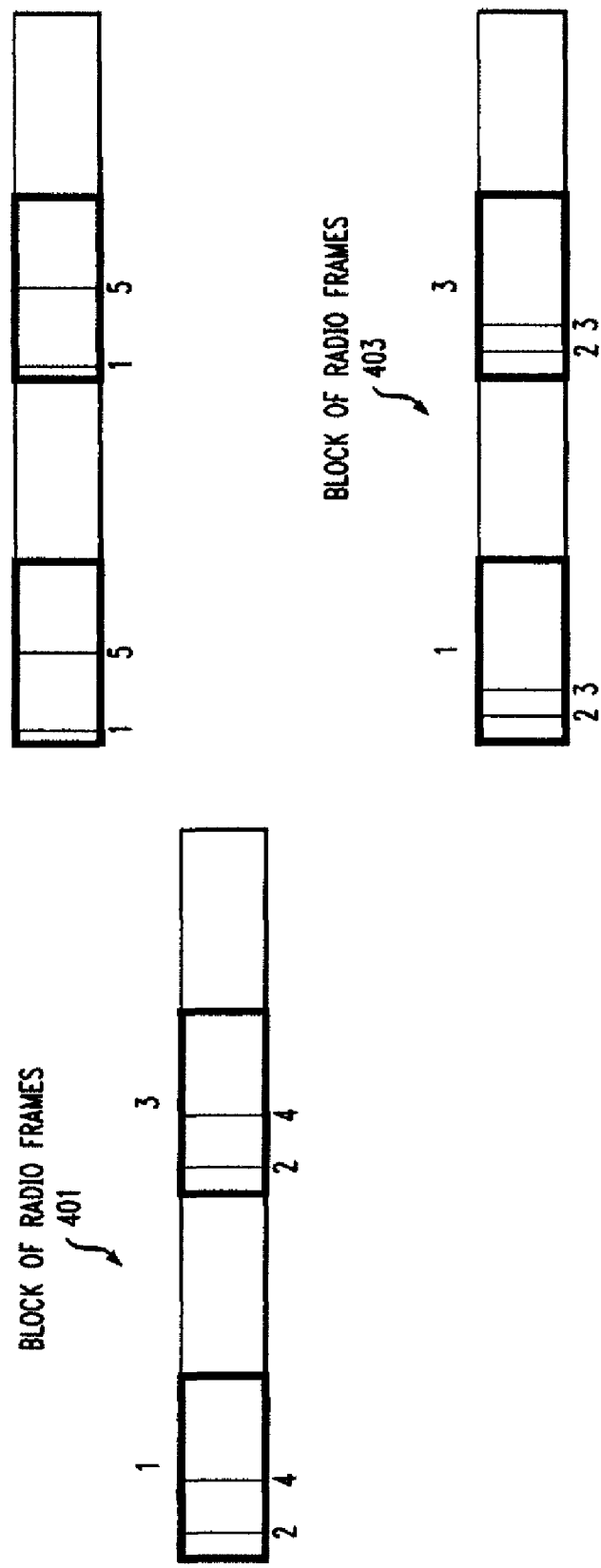
FIG. 4 shows another example of a set of frames and their corresponding sub-frames.

FIG. 4 shows three blocks of radio frames 401, 402 and 403, wherein the first block 401 corresponds to the radio frames transmitted by the first base station 101 and the blocks 402 and 403 correspond to blocks being transmitted by the neighboring base stations.

The first block of radio frames 401 comprise a radio frame allocation pattern of radio frames containing synchronized subframes in the radio frame positions 1 and 3. The radio frame allocation comprises radio frames being eligible to allocate synchronized subframes. The neighboring base station 402 and 403 also includes a radio frame allocation pattern using radio frame position 1 and 3. Therefore, the second signal that indicates the radio frame allocation pattern of the signal 107 will indicate that the macro allocation pattern is the same for the first base station and all neighboring base stations.

On the subframe level, if the subframe allocation patterns for the radio frames containing the synchronized subframes is compared, the first base station that transmits the block 401 differs from the neighboring base stations that transmit the blocks 402 and 403. The first base station allocates the synchronized subframes in the subframe positions 2 and 4, whereas one of the neighboring base stations allocate the synchronized subframes in the subframe positions 1 and 5, and the other neighboring base station allocates the synchronized subframes in the subframe positions 2 and 3. Therefore, the first bit signal indicates a difference between the subframe allocation pattern. In this way, for the example of FIG. 4, the first bit indicates a difference in the subframe allocation pattern and the second bit indicates a difference in the radio frame allocation pattern.

Figure 5:
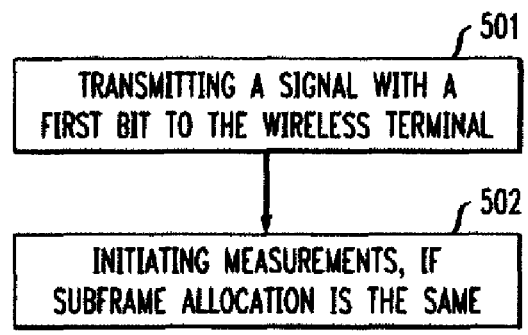
FIG. 5 shows a flow chart of a signaling method.

FIG. 5 shows a flow chart of a signaling method in a first base station adapted for synchronized multimedia broadcast/multicast transmissions. In the method in a first step 501 a first base station transmits a signal describing a set of base stations neighboring the first base station over a broadcast channel to at least a wireless terminal. In the signal a first bit indicates if a first subframe allocation pattern of synchronized subframes per radio frame in the first base station equals a second subframe allocation pattern of synchronized subframes per radio frame for all base stations of the set of base stations. The set of base stations that neighbour the first base station are not directly transmitting to the wireless terminal, but are candidates for cell reselection or for a handover.

In an enhancement of the method, in a second step 502 the wireless terminal initiates a first more accurate measurement of a channel quality of the set of base stations that neighbour the first base station, by excluding synchronized subframes of all radio frames according to the first subframe allocation pattern, if the first bit indicates that the first subframe allocation pattern equals the second subframe allocation pattern.

Figure 6:
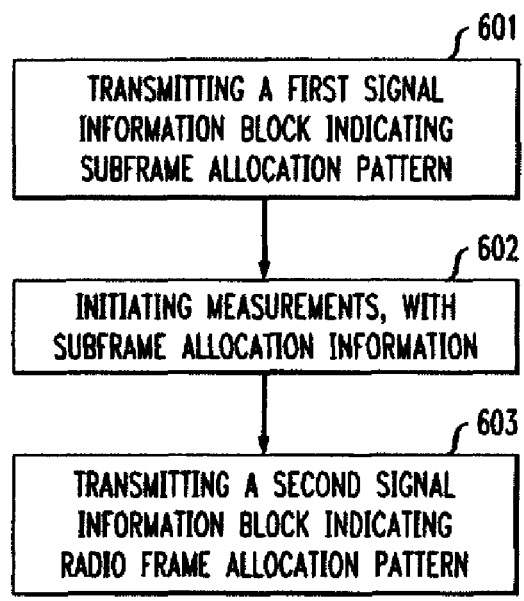
FIG. 6 shows a flow chart of a signaling allocation method.

FIG. 6 shows a resource allocation signalling method in a base station adapted for synchronized multimedia broadcast/multicast transmissions. The method comprises a first step 601 where the base station periodically transmits a first signal information block that comprises information on a subframe allocation pattern of synchronized subframes per radio frame. In a second step 602, the wireless terminal initiates a more accurate measurement of the channel quality by excluding synchronized subframes of all radio frames according to the information transmitted by the first signal information block.

Finally, in a third step 603, the base station periodically transmits a second signal information block to the wireless terminal. The second information block comprises information on an allocation pattern of radio frames carrying synchronized subframes within a predetermined repetition period. The first information block is transmitted more often than the second information block. The synchronized subframes are allocated within the radio frames according to the information of the first information block.

---

List of Reference Numerals 100 mobile communication system
101 first base station
102 wireless terminal -continued List of Reference Numerals

| | |
|---|---|
| 103 | neighboring base station |
| 104 | neighboring base station |
| 105 | neighboring base station |
| 106 | neighboring base station |
| 107 | signal |
| 108 | computer program product |
| 201 | first signal information block |
| 202 | second signal information block |
| 203 | computer program product |
| 301 | block of radio frames |
| 302 | block of radio frames |
| 303 | block of radio frames |
| 401 | block of radio frames |
| 402 | block of radio frames |
| 403 | block of radio frames |
| 501 | first step |
| 502 | second step |
| 601 | first step |
| 602 | second step |
| 603 | third step |

The invention claimed is:

1. A signalling method in a first base station of a mobile communications system adapted for synchronized transmissions, said first base station transmitting to a wireless terminal, said mobile communication system further comprising a set of base stations neighbouring said first base station, the method comprising:
transmitting a signal describing said set of base stations over a broadcast channel by said first base station to said wireless terminal;
wherein a first bit of said signal indicates if a first subframe allocation pattern of synchronized subframes per radio frame in said first base station equals a second subframe allocation pattern of synchronized subframes per radio frame for all base stations of said set of base stations;
wherein said set of base stations neighbouring said first base station are candidates for starting a transmission to said wireless terminal.

2. The method of claim 1, wherein said synchronized subframes contain data of said synchronized transmissions.

3. The method of claim 1 further comprising:
initiating a first measurement of a channel quality of said set of base stations by said wireless terminal by excluding synchronized subframes of all radio frames according to said first subframe allocation pattern if said first bit indicates that said first subframe allocation pattern equals said second subframe allocation pattern.

4. The method of claim 1, wherein a second bit of said signal indicates if a first radio frame allocation pattern of radio frames comprising said first subframe allocation pattern in said first base station equals a second radio frame allocation pattern of radio frames with any subframe allocation pattern for all base stations of said set of base stations, wherein said first and second radio frame allocation pattern occur within a predetermined repetition period.

5. The method of claim 1 further comprising:
initiating a second measurement of said channel quality by said wireless terminal by excluding all synchronized subframes, if said first bit indicates that said first subframe allocation pattern equals said second subframe allocation pattern and if said second bit indicates that said first radio frame allocation pattern equals said second radio frame allocation pattern.

6. The method of claim 1, wherein the synchronized transmissions are synchronized multimedia broadcast/multicast transmissions.

7. A resource allocation signalling method in a base station of a mobile communications system adapted for synchronized transmissions, said first base station transmitting to a wireless terminal, the method comprising:
transmitting periodically a first signal information block to said wireless terminal by said base station, wherein said first signal information block comprises information on a subframe allocation pattern of synchronized subframes per radio frame;
transmitting periodically a second signal information block by said base station to said wireless terminal;
wherein said first signal information block is periodically transmitted more frequently than said second signal information block;
wherein said second signal information block comprises information on an allocation pattern of radio frames carrying synchronized subframes within a predetermined repetition period; wherein said synchronized subframes are allocated within said radio frames according to said information of said first information block.

8. The method of claim 7 further comprising:
initiating a measurement of a channel quality by said wireless terminal by excluding synchronized subframes of all radio frames according to said information transmitted by said first signal information block.

9. The method of claim 7, wherein said periodic transmission of said second signal information block equals said predetermined repetition period of radio frames.

10. The method of claim 7, wherein said second information block is not transmitted, if said first information block indicates that no synchronized subframes are assigned.

11. The method of claim 7, wherein each bit of said second signal information block indicates an allocation of synchronized subframes for each radio frame.

12. The method of claim 7, wherein said base station is part of said set of neighbouring base stations.

13. The method of claim 1 wherein the base station for a mobile communication system is operable to perform the method.

14. The method of claim 6 wherein the base station for a mobile communication system is operable to perform the method.

15. The method of claim 1 implemented in a computer program product stored on a non-transitory storage medium, comprising a computer executable program for causing a base station to perform the method when the program is run on the base station.

16. The method of claim 6 implemented in a computer program product stored on a non-transitory storage medium, comprising a computer executable program for causing a base station to perform the method when the program is run on the base station.

17. The method of claim 7, wherein the synchronized transmissions are synchronized multimedia broadcast/multicast transmissions.

18. A base station of a mobile communications system adapted for synchronized transmissions, said base station comprising:
a transmission unit configured to transmit a signal describing a set of further base stations of said mobile communications system neighbouring said base station over a broadcast channel;
wherein a first bit of said signal indicates if a first subframe allocation pattern of synchronized subframes per radio frame in said base station equals a second subframe allocation pattern of synchronized subframes per radio frame in base stations of said set of further base stations; and wherein said set of further base stations neighbouring said base station are candidates for starting a transmission to a wireless terminal.

19. A base station of a mobile communications system adapted for synchronized transmissions, said base station comprising a transmission unit configured to:

transmit periodically a first signal information block to a wireless terminal, wherein said first signal information block comprises information on a subframe allocation pattern of synchronized subframes per radio frame; and transmit periodically a second signal information block to said wireless terminal;

wherein said first signal information block is periodically transmitted more frequently than said second signal information block;

wherein said second signal information block comprises information on an allocation pattern of radio frames carrying synchronized subframes within a predetermined repetition period; wherein said synchronized subframes are allocated within said radio frames according to said information of said first information block.

* * * * *